United States Patent
Mir Bel

(10) Patent No.: US 12,460,825 B2
(45) Date of Patent: Nov. 4, 2025

(54) HOME APPLIANCE SYSTEM

(71) Applicant: BSH Hausgeräte GmbH, Munich (DE)

(72) Inventor: Jorge Mir Bel, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 613 days.

(21) Appl. No.: 16/060,047

(22) PCT Filed: Nov. 24, 2016

(86) PCT No.: PCT/IB2016/057090
§ 371 (c)(1),
(2) Date: Jun. 7, 2018

(87) PCT Pub. No.: WO2017/103711
PCT Pub. Date: Jun. 22, 2017

(65) Prior Publication Data
US 2018/0363916 A1 Dec. 20, 2018

(30) Foreign Application Priority Data
Dec. 17, 2015 (ES) .............................. ES201531832

(51) Int. Cl.
*F24C 7/08* (2006.01)

(52) U.S. Cl.
CPC ................... *F24C 7/083* (2013.01)

(58) Field of Classification Search
CPC ...................................... F24C 7/083
USPC ............ 219/447.1, 450.1, 452.11, 209, 438; 340/540, 541, 636; 99/444, 446, 400, 99/422, 425, 331, 337, 468, 473, 482, 99/342; 126/274, 271.3, 25, 40, 50; 235/375, 462.01, 472.01–472.03
See application file for complete search history.

(56) References Cited

U.S. PATENT DOCUMENTS

| | | |
|---|---|---|
| 5,136,277 A | 8/1992 | Civanelli et al. |
| 5,361,681 A | 11/1994 | Hedstroem et al. |
| 5,717,188 A | 2/1998 | Vaillancourt |
| 6,137,095 A | 10/2000 | Kashimoto et al. |
| 2007/0012307 A1* | 1/2007 | Wiker ...................... A21B 1/40 126/21 A |
| 2011/0123689 A1* | 5/2011 | Luckhardt ............ H05B 1/0263 426/520 |
| 2011/0132201 A1 | 6/2011 | Richardson et al. |

(Continued)

FOREIGN PATENT DOCUMENTS

| | | | | |
|---|---|---|---|---|
| CN | 103874976 A | * | 6/2014 | .............. F24C 7/082 |
| DE | 102005040206 A1 | | 2/2007 | |

(Continued)

OTHER PUBLICATIONS

International Search Report PCT/IB2016/057090 dated Feb. 23, 2017.
National Search Report ES 201531832 dated Nov. 14, 2016.

*Primary Examiner* — Steven W Crabb
*Assistant Examiner* — Ket D Dang
(74) *Attorney, Agent, or Firm* — Michael E. Tschupp; Brandon G. Braun; Andre Pallapies

(57) ABSTRACT

A generic system with improved characteristics regarding advantageous operating characteristics, a home appliance system is proposed comprising a hob, which has a control unit (14), and comprising a functional unit that is different from the hob and is provided for communicating with the control unit in at least one operating state.

22 Claims, 3 Drawing Sheets

(56) References Cited

U.S. PATENT DOCUMENTS

| | | | |
|---|---|---|---|
| 2011/0134413 A1 | 6/2011 | Has et al. | |
| 2011/0253693 A1* | 10/2011 | Lyons | A47J 27/00 |
| | | | 219/209 |
| 2012/0097045 A1* | 4/2012 | Kurimoto | H05B 6/062 |
| | | | 219/209 |
| 2012/0237646 A1* | 9/2012 | De Luca | G06Q 30/04 |
| | | | 99/357 |
| 2013/0052616 A1* | 2/2013 | Silverstein et al. | |
| | | | G09B 19/0092 |
| | | | 434/127 |
| 2013/0092032 A1 | 4/2013 | Cafferty et al. | |
| 2013/0229492 A1 | 9/2013 | Ose et al. | |
| 2014/0199455 A1* | 7/2014 | Bilet | A47J 27/04 |
| | | | 426/510 |
| 2015/0005950 A1* | 1/2015 | Trench Roca | H04L 12/2803 |
| | | | 700/275 |
| 2015/0285512 A1* | 10/2015 | Matarazzi | F27D 21/02 |
| | | | 99/341 |
| 2015/0334785 A1 | 11/2015 | Visher et al. | |
| 2016/0051078 A1* | 2/2016 | Jenkins | F24C 3/12 |
| | | | 99/331 |
| 2016/0213033 A1* | 7/2016 | Kim | H05B 6/6435 |
| 2016/0350715 A1* | 12/2016 | Minvielle | G01N 33/02 |

FOREIGN PATENT DOCUMENTS

| | | | | |
|---|---|---|---|---|
| EP | 2688366 A1 | | 1/2014 | |
| EP | 2693127 A1 | | 2/2014 | |
| EP | 2706816 A1 | | 3/2014 | |
| EP | 2775212 A1 | * | 9/2014 | A23L 5/10 |
| EP | 2941986 A1 | | 11/2015 | |
| WO | 03031876 A1 | | 4/2003 | |
| WO | 2015135031 A1 | | 9/2015 | |

* cited by examiner

HOME APPLIANCE SYSTEM

CROSS-REFERENCES TO RELATED APPLICATIONS

This application is the U.S. National Stage of International Application No. PCT/IB2016/057090, filed Nov. 24, 2016, which designated the United States and has been published as International Publication No. WO 2017/103711 A1 and which claims the priority of Spanish Patent Application, Serial No. P201531832, filed Dec. 17, 2015, pursuant to 35 U.S.C. 119(a)-(d).

BACKGROUND OF THE INVENTION

The present invention generally relates to a home appliance system.

From the prior art a home appliance system is already known comprising a hob, which has a control unit. The home appliance system further comprises a functional unit that is different from the hob. The functional unit could be a scales or a refrigerator or a cooking device like for example an oven. In an operating state a user has to operate the hob and the functional unit separately. For using some data detected by the functional unit in a cooking process the user has to transfer these data via an operating interface to the hob.

BRIEF SUMMARY OF THE INVENTION

It is an object of the invention, in particular, to provide a generic system with improved characteristics regarding advantageous operating characteristics. The objective is achieved, according to the invention, by the features of the invention.

According to the invention a home appliance system, in particular a cooking system, is proposed comprising a hob, in particular an induction hob, which has a control unit in particular provided for controlling a cooking process, and comprising a functional unit that is different from the hob and is provided for communicating with the control unit in at least one operating state. A "control unit" is to be understood, in particular, as an electronic unit that is preferably at least partially integrated in a controlling and/or regulating unit of the hob and is preferably provided for controlling and/or regulating at least one heating element. Preferably, the control unit comprises a computing unit and in particular, in addition to the computing unit, a storage unit with a controlling and/or regulating program stored therein, which is provided to be executed by the computing unit. A "functional unit" is to be understood, in particular, as an electric unit that is in particular provided for processing a victual and/or for stocking a victual and/or for detecting a parameter of a victual. In particular, a functional unit that is provided for processing a victual could be provided for mixing and/or stirring and/or grinding and/or comminuting and/or crushing and/or blending and/or emulgating and/or kneading and/or cutting the victual. A functional unit provided for stocking a victual could in particular comprise a refrigerator, for example a refrigerating device and/or a freezing device. The parameter of the victual could be, for example, a temperature and/or an aggregate state and/or a weight and/or a size and/or an amount and/or a kind of the victual. The functional unit comprises in particular at least one home appliance device, in particular at least one kitchen appliance. The functional unit comprises in particular a communication unit. The control unit comprises in particular a communication unit. A "communication unit" is to be understood, in particular, as a unit, which is in the operating state provided for in particular wireless sending, in particular transferring and/or transmitting at least one parameter to at least one further unit, and/or for in particular wireless receiving of at least one information from at least one further unit. In particular, the communication unit is provided for exchanging, in the operating state, the information with the further unit via ultrasonic sound and/or via infrared and/or via Bluetooth and/or via RFID and/or via electromagnetic radiation and/or via ZigBee and/or via a wireless network and/or via BLE, in particular via Bluetooth Low Energy. The information could be for example a victual parameter and/or an operating parameter. In particular, the communication unit of the functional unit and the communication unit of the control unit are provided for exchanging at least one information, in particular the information. "Communicating" and/or "exchange" is to be understood, in particular, as sending and/or receiving. "Provided" is to be understood, in particular, as specifically programmed, designed and/or equipped. By an object being provided for a certain function is to be understood, in particular, that the object implements and/or fulfills said certain function in at least one application state and/or operating state.

By the implementation according to the invention, advantageous operating characteristics can be made available, in particular in the form of a high flexibility and/or of low costs and/or of optimized cooking results. In particular, a high level of measurement accuracy is achievable and/or measuring errors resulting for example from a hob plate are avoidable. Information can be exchanged in particular quickly and flexibly, on account of which in particular an integration of functional units in the hob can be dispensed with. In particular, an integration of a functional unit comprising at least one measurement device in the hob can be avoided. Data provided by the functional unit can be in particular easily implemented in a cooking process. In particular, reproducibility and/or convenience and/or performance of cooking assistance features can be fastened. The possibility of offering additional values, which can for example be downloaded and/or bought after buying the hob, can be in particular created, making it, in particular, possible to differ from competitors.

In one embodiment of the invention it is suggested that the functional unit is provided for transferring in the operating state at least one victual parameter of a victual that is to be cooked to the control unit. The victual parameter could for example be a temperature and/or an aggregate state and/or a weight and/or a height and/or a freshness and/or a stage of maturity and/or viscosity and/or a type of the victual. As a result of this, in particular an optimal preparation of the victual to be prepared can be enabled.

According to a further aspect of the invention it is suggested that the control unit is provided for suggesting, in particular for presenting an operator via an operating interface, in the operating state, in dependency of the victual parameter, a heating zone suitable for a cooking of the victual to be cooked. The control unit is in particular provided to select, in the operating state, in dependency of a victual parameter, at least one heating zone from a group of at least two, in particular of at least three, advantageously of at least four, preferably of at least five heating zones. The control unit is in particular provided to detect, in the operating state, in dependency of a victual parameter, at least a cooking pan parameter of an appropriate cooking pan. The cooking pan parameter could for example be a height and/or a kind of an appropriate cooking pan. The control unit is in particular provided for suggesting the detected cooking pan parameter and in particular for presenting an operator via an operating interface. The control unit is in particular provided for detecting an appropriate heating zone via the detected cooking pan parameter. The cooking system comprises in particular an operating interface for at least one input and/or for a selection of operating parameters. The operating parameter could for example be a heating zone and/or a heating intensity and/or a time. The heating intensity is in particular a heating power and/or a heating power stage and/or a heating power density. By that, the victual parameter can be in particular beneficially used. In particular, an optimum heating can be provided. An economical method of operation can be advantageously reached by a height of a heating zone that is as optimally as possible adjusted to a height of a cooking pan.

According to another aspect of the invention it is suggested that the control unit is provided for determining in the operating state, in dependency of the victual parameter, at least one operating parameter and for taking the determined operating parameter into account when cooking the victual. The operating parameter could be in particular a speed, such as a modeling speed and/or a stir speed and/or a fineness of a preparation, such as in case of a grinding and/or of a mixing. Advantageously, the operating parameter is a preparation time, in particular a cooking time and/or a preparation level, such as in particular a heating power and/or a temperature. As a result of this, in particular an inappropriate preparation, in particular an incomplete cooking and/or a burning can be avoided.

In another embodiment of the invention it is suggested that the control unit is provided for detecting, in the operating state, via the determined operating parameter, an imminent empty cooking with an empty cooking pan and for initiating at least one action for avoiding cooking with an empty cooking pan. The control unit is in particular provided for considering at least the victual parameter and in particular additionally a heating intensity. For example considering the case that 1000 ml of water need an energy of at least 2257 KJ for evaporation according to their evaporation enthalpy. In particular, the control unit could be provided to show a warning after an effective energy supply of round about 2100 KJ. The imminent empty cooking is in particular an empty cooking to be expected in the near future, which occurs, in particular with otherwise unchanged external conditions, such as a power input and/or a heating power and/or a position of the cooking pan, and advantageously by avoiding a refill and/or a fill-up of victuals arranged in the cooking pan in the near future. Under a "near future", in particular a period of maximum 300 s, in particular of maximum 200 s, advantageously of maximum 100 s, especial advantageously of maximum 60 s and preferably of maximum 30 s should be understood. The action could be for example a readout of a warning and/or of an information regarding the imminent empty cooking via an operating interface. The control unit could be in particular provided for reading out, in the operating state, a warning and/or an information regarding the imminent empty cooking via an operating interface. As an alternative or additionally, the action could be a change of a heating of the cooking pan. The control unit could be in particular provided for carrying out, in the operating state, a change of the heating of the cooking pan, such as in particular a reduction of a heating power and/or a complete interruption of an energy input and/or a timely interruption of an energy input and/or an avoidance of a high energy input. The action could be, as an alternative or additionally, an activation of at least one further unit. The control unit could be in particular provided for activating a further unit in the operating state, such as at least a sensor and/or a fume hood. As a result of this, in particular the imminent empty cooking of the cooking pan can be prevented and/or the imminent empty cooking of the cooking pan can be avoided.

The control unit could for example be provided to read out, in the operating state, the operating parameter via the operating interface and to suggest it to an operator. Advantageously the control unit is provided for starting an automatic cooking process in the operating state, taking the determined operating parameter into account. By that, an in particular high comfort could be reached for the operator and/or the effort of an activation of an automatic cooking process can be taken from the operator.

The control unit could for example be provided for activating a further heating zone during the automatic cooking process, for example to keep the victuals warm and/or for preparation of a further ingredient. Advantageously, the control unit is provided for activating at least one cooking device of the functional unit during the automatic cooking process. The control unit is in particular provided for activating the cooking device of a functional unit during the automatic cooking process, in particular for a use in the near future, in particular to preheat it, and advantageously to request an operator in the near future to insert a victual to be prepared in the cooking device by an operating request via the operating interface. The cooking device could be for example a microwave and/or a brazier/barbecue and/or a stove and/or an oven. As a result of this, in particular a smooth and/or quick preparation process can be provided.

In a preferred embodiment of the invention it is suggested that the control unit is provided for requesting, in the operating state, at least one information from a refrigerator of the functional unit. The information could be in particular an availability of a victual and/or a list of available victuals, which could be in particular part of the recipe. The control unit is in particular provided to display an operating request via an operating interface depending on the information. The control unit could for example be provided to request the operator to insert and/or to add the victual, in particular when a victual is available. In case the victual is not available, the control unit could be provided to request the operator via the operating request for a provision of the victual. The control unit could be in particular provided to detect at least one possible recipe with help of the list with available victuals, in particular to request it from a recipe data base and/or to select from recipes that are deposited in the storage unit of the control unit. The control unit could in particular be provided to display the list of victuals and/or at least a list of possible recipes and/or a suggestion of a possible recipe. As a result of this, in particular displeasing operations could be avoided for the operator.

According to a further aspect of the invention it is suggested that the functional unit comprises scales which are provided for detecting at least a weight of at least one victual and for transmitting the weight, in particular as a victual parameter, to the control unit. The control unit is in particular provided to consider, in the operating state, the weight when preparing a victual and advantageously to select a heating power in dependency of the weight. As a result of this, in particular a high exactness of measurement can be reached and/or a falsification of the measuring results, which could for example be generated by a hob plate, could be avoided. In particular, an integration of scales in the hob can be avoided.

The control unit could for example be provided to display, in the operating state in dependency of the weight, an operating request for an operating input of a type of a victual via the operating interface. Advantageously, the home appliance system comprises a sensor unit, which is provided for detecting at least one type of the victual and for transferring the type of the victual to the control unit, in particular as a victual parameter. The sensor unit could for example comprise an infrared-sensor and/or a spectrometer and/or an image capturing unit, such as a camera and/or a video player. As a result of this, in particular a high comfort for the operator could be reached.

In another embodiment of the invention it is suggested that the scales and the sensor unit are embodied in a one-part implementation. The sensor unit is in particular substantially integrated in the scale housing of the scale and is advantageously arranged at least to a large extend inside the scale housing. As a result of this, in particular a compact and/or space-saving embodiment can be provided.

Especially advantageous operating characteristics can provided by a hob, in particular by an induction hob, for a cooking system according to the invention.

The home appliance system is herein not to be limited to the application and implementation described above. In particular, for the purpose of fulfilling a functionality herein described, the home appliance system can comprise a number of respective elements, structural components and units that differ from the number mentioned herein.

Further advantages may be gathered from the following description of the drawings. In the drawing exemplary, embodiments of the invention are shown. The drawing, the description and the claims contain a plurality of features in combination. The person having ordinary skill in the art will purposefully also consider the features separately and will find further expedient combinations.

BRIEF DESCRIPTION OF THE DRAWINGS

The present invention will now be described, by way of example only, with reference to the accompanying drawings in which the following features are shown.

DETAILED DESCRIPTION OF EXEMPLARY EMBODIMENTS OF THE PRESENT INVENTION

Figure 1:
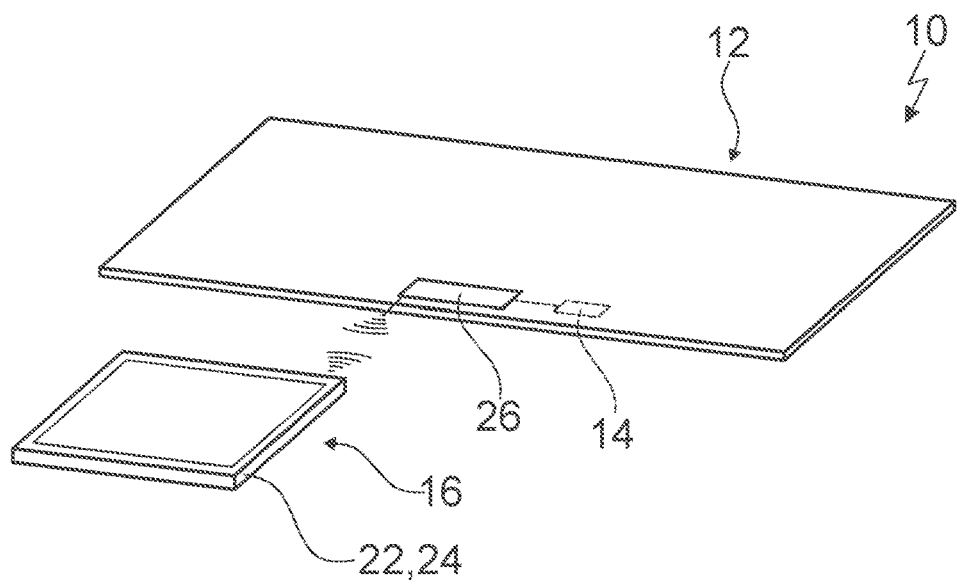
FIG. 1 a simplified schematic view of a home appliance system comprising a hob and a functional unit, which has scales in an operating state FIG. 2 a simplified schematic view of an operating interface of the hob in an operating state, FIG. 3 a simplified schematic view of the home appliance system further comprising a vessel in the operating state, FIG. 4 a simplified schematic view of the home appliance system in the operating state, FIG. 5 a simplified schematic view of the home appliance system in the operating state, FIG. 6 a simplified schematic view of the home appliance system further comprising a further vessel in the operating state and FIG. 7 a simplified schematic view of the home appliance system in the operating state.
Figure 2:
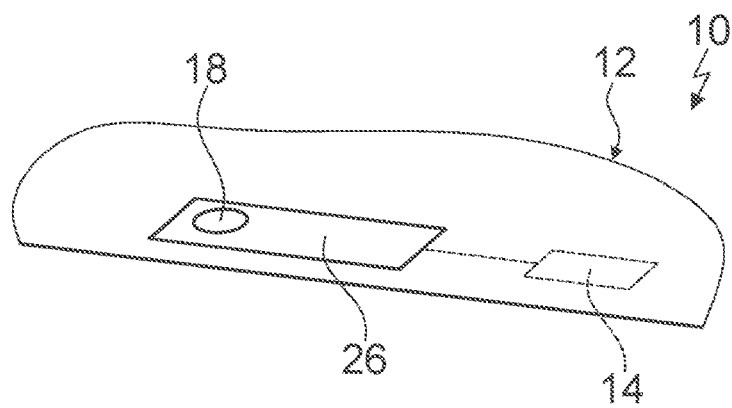
Figure 3:
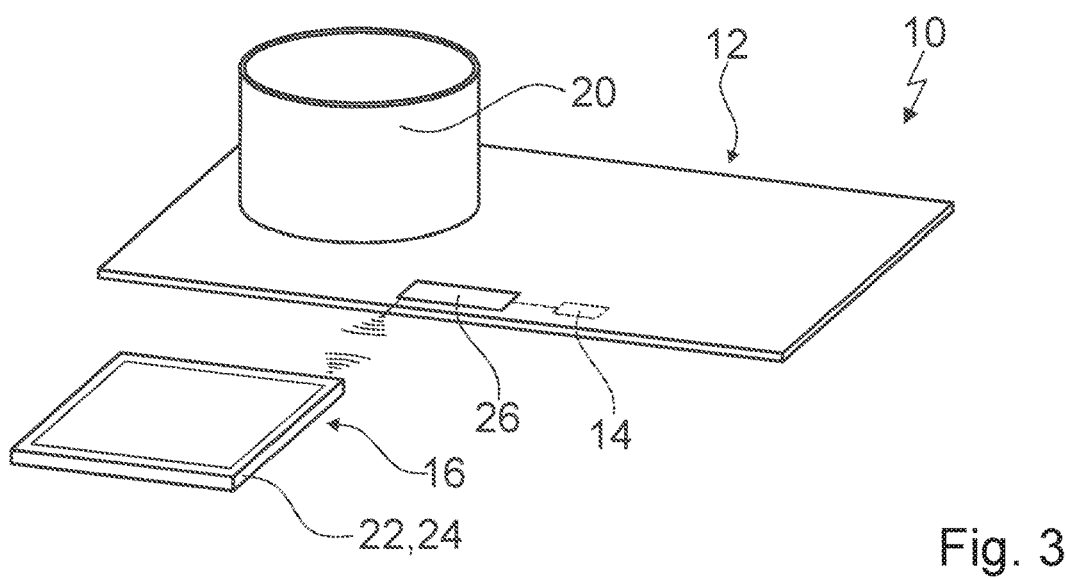

FIG. 1 shows a home appliance system 10 comprising a hob 12 and a functional unit 16. The home appliance system 10 is embodied as a cooking system. The hob 12 is embodied as an induction hob. The hob 12 is specially developed and/or designed for the home appliance system 10.

The hob 12 comprises at least one heating unit (not shown). In the present embodiment the hob 12 comprises several heating units. The heating units are embodied as induction heating units. As an alternative, the heating units could be embodied as resistance-heating units.

The hob 12 further comprises an operating interface 26 (compare FIG. 1 to 7). The operating interface 26 is provided for entering and/or choosing at least one parameter. The parameter could be a heating power and/or a heating density and/or a heating stage and/or a heating zone. The operating interface 26 is provided for showing at least one parameter in particular to the user.

The hob 12 further comprises a control unit 14 (compare FIGS. 1 to 7). The control unit 14 is provided for controlling and/or regulating at least the heating units. In dependence of an entering and/or choosing via the operating interface 26, the control unit 14 executes at least one action.

The control unit 14 is provided for controlling and/or regulating an energy supply to the heating units in an operating state. In the operating state the control unit 14 is provided for controlling and/or regulating a cooking process.

The functional unit 16 is different from the hob 12. The functional unit 16 comprises several kitchen home appliance devices. In the present embodiment the functional unit 16 comprises several kitchen appliance devices. In the operating state the functional unit 16 is provided for communicating with the control unit 14. The control unit 14 is provided for communicating with the functional unit 16 in the operating state.

The functional unit 16 is provided for transferring in the operating state at least one victual parameter of a victual to the control unit 14. In the present embodiment the functional unit 16 is provided for transferring, in the operating state, at least one victual parameter of a victual to be cooked to the control unit 14.

The control unit 14 is provided for suggesting in the operating state, in dependency of the victual parameter, a heating zone 18 suitable for a cooking of the victual to be cooked. In the present embodiment the control unit 14 is provided for suggesting, in the operating state, the heating zone 18 via the operator interface 26 (compare FIG. 2). The operator places a cooking pan 20 on the suggested heating zone 18 (compare FIG. 3).

In the operating state the control unit 14 is provided for determining, in dependency of the victual parameter, at least one operating parameter. The operating parameter comprises a heating power. The operating parameter comprises a cooking time. In the operating state the control unit 14 is provided for taking the determined operating parameter into account when cooking the victual.

The control unit 14 is provided for detecting, in the operating state, via the determined operating parameter, an imminent empty cooking with an empty cooking pan 20. In case of a detection of an imminent empty cooking the control unit 14 is provided for initiating at least one action to avoid cooking with an empty cooking pan 20. In the operating state the control unit 14 shows via the operating interface 26 at least one warning, in particular to the operator. As an alternative or additionally, the control unit could be provided for deactivating the heating units defining the heating zone on which the heated cooking pan is placed.

The control unit 14 is provided for starting an automatic cooking process in the operating state, taking the determined operating parameter into account. In the present embodiment the control unit 14 is provided for starting automatically the automatic cooking process in the operating state.

As an alternative or additionally, the control unit could be provided for starting, in dependence of an entering via the operating interface the automatic cooking process in the operating state.

The functional unit 16 comprises a cooking device (not shown). In the present embodiment the cooking device is an oven. As an alternative or additionally, the cooking device could be a micro-wave oven. In the operating state the control unit 14 is provided for activating the cooking device of the functional unit 16 during the automatic cooking process.

The functional unit 16 comprises a refrigerator (not shown). The control unit 14 is provided for requesting, in the operating state, information from the refrigerator of the functional unit 16. In the operating state the control unit 14 is provided for requesting information concerning missing victuals for further execution of the automatic cooking process from the refrigerator.

After having received positive feedback from the refrigerator, the control unit 14 shows an operating request via the operating interface 26. The control unit 14 is provided for showing an operating request for weighting the missing victual via the operating interface 26. In the present embodiment the missing victual is a meat, in particular a steak.

The functional unit 16 comprises scales 22. The scales 22 are provided for detecting at least one weight of an object placed on the scales 22 in the operating state. In the operating state the scales 22 are provided for transferring the detected weight of the object to the control unit 14. The victual parameter comprises the detected weight of the object.

Figure 4:
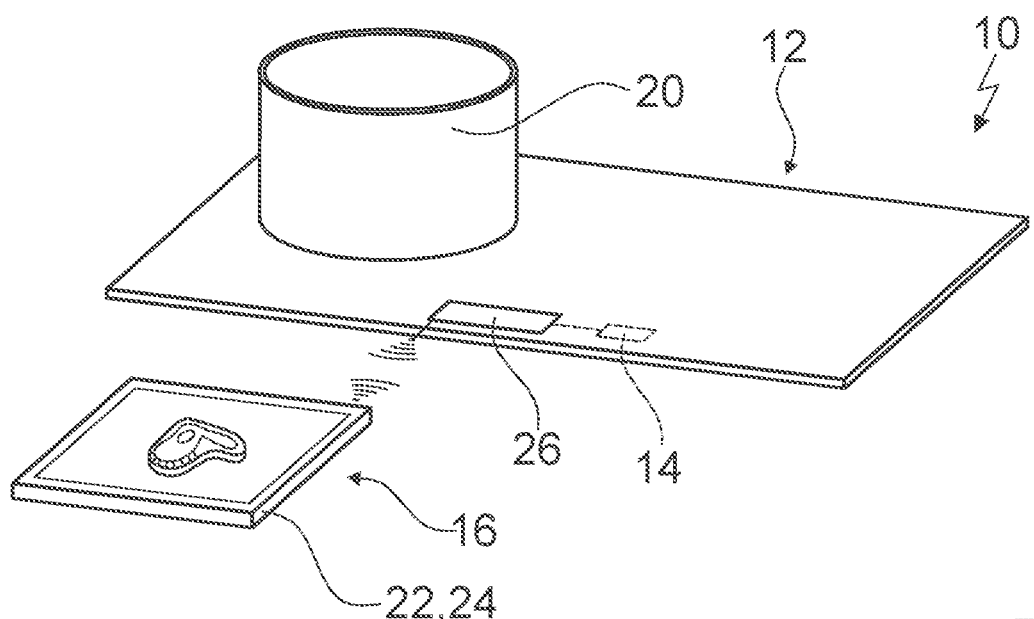
Figure 5:
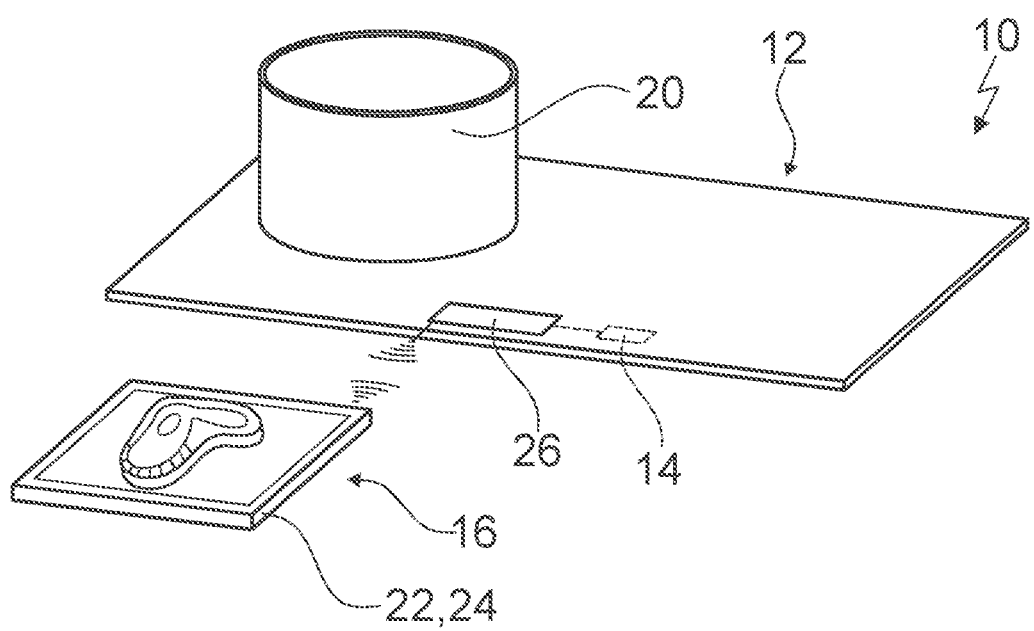
Figure 6:
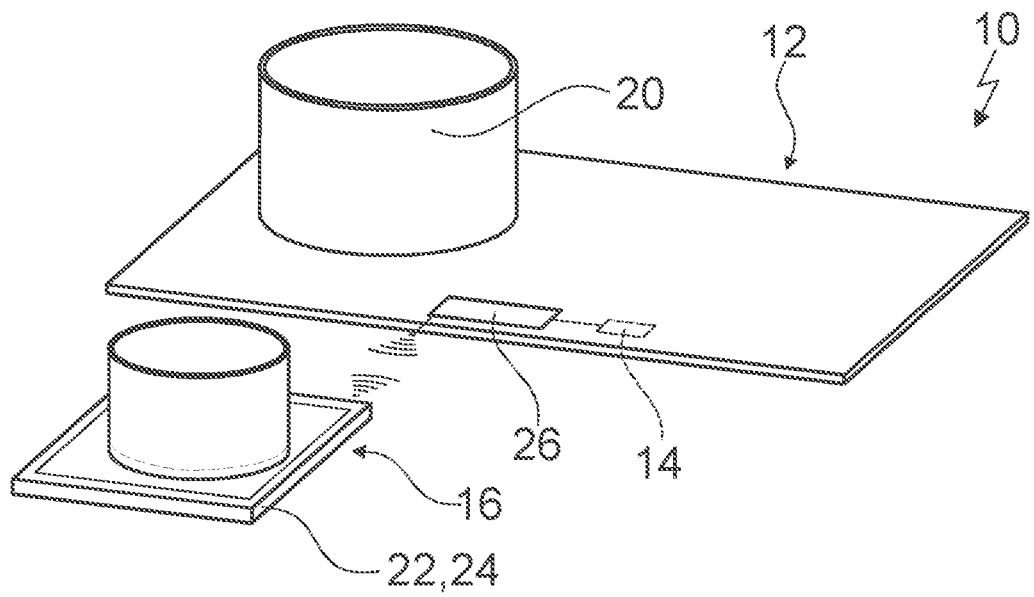
Figure 7:
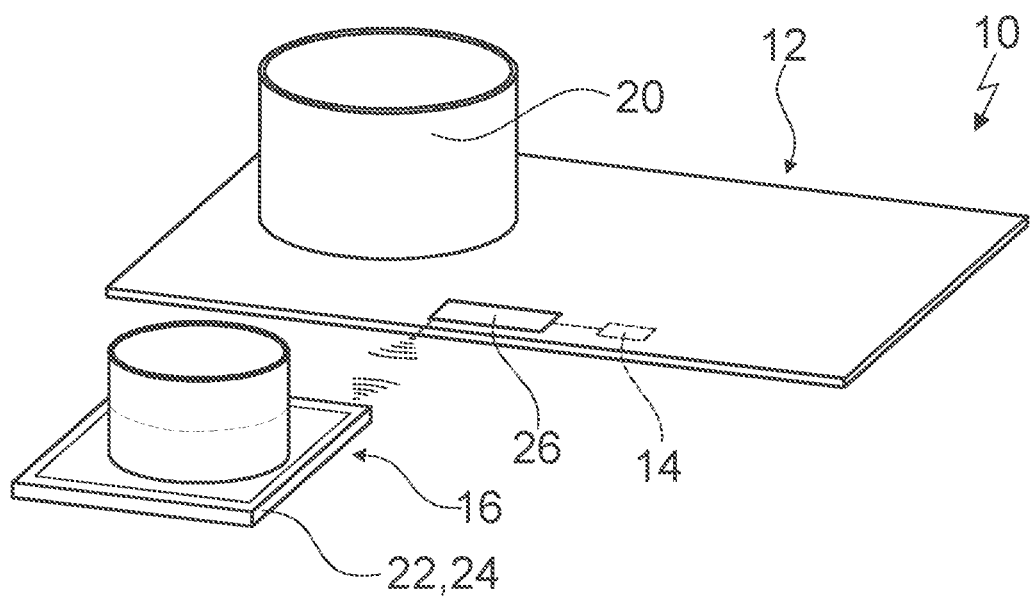

The operator weights the missing victual (compare FIG. 4). The scales 22 are provided for detecting the weight of the victual placed on the scales 22 in the operating state. In the operating state the scales 22 are provided for transmitting the weight as a victual parameter to the control unit 14. The victual parameter comprises the weight of the victual.

In the operating state the control unit 14 is provided for showing an operating request for an additional victual as the weight of the first victual is lower than the requested amount of the victual in the recipe of the automatic cooking program. The operator weights the further victual (compare FIG. 5).

The home appliance system 10 comprises a sensor unit 24. The sensor unit 24 is provided for detecting, in the operating state, a type of the victual placed on the scales 22. In the operating state the sensor unit 24 is provided for transferring the type of the victual to the control unit 14 as a victual parameter. The victual parameter comprises a meat, in particular a steak. In the present embodiment the scales 22 and the sensor unit 24 are embodied in a one-part implementation.

In the next step of the automatic cooking program the control unit 14 shows an operating request for a given amount of a further victual via the operating interface 26. The further victual is a liquid. The operator weights the further victual (compare FIG. 6). The scales 22 are provided for transmitting the weight of the further victual as a victual parameter to the control unit 14. As the weight of the further victual is lower than the requested amount of the victual in the recipe, the control unit 14 is provided for showing an operating request for a greater amount of the further victual. The operator weights the greater amount of the further victual (compare FIG. 7).

The invention claimed is:

1. A home appliance system, comprising:
a hob including a control unit configured to control at least one heating element of the hob; and
a functional unit comprising at least one home appliance device different from the hob, the functional unit including a sensor unit having a camera configured to generate an image of a victual to be cooked, the sensor unit configured to detect a victual type of the victual to be cooked based on the image of the victual and to communicate the detected victual type to the control unit;
wherein the control unit is configured to determine, based on the detected victual type, an operating parameter and to automatically start an automatic cooking process based on the determined operating parameter, wherein the automatic cooking process includes controlling the at least one heating element based on the operating parameter.

2. The home appliance system of claim 1, wherein the determined operating parameter is a level of heat of the at least one heating element, and wherein the control unit is configured to detect, based on the level of heat, that a cooking pan on the hob will imminently be empty, and to initiate an action to avoid cooking when the cooking pan is empty.

3. The home appliance system of claim 1, wherein the functional unit comprises a refrigerator, wherein the control unit is configured to request information from the refrigerator.

4. The home appliance system of claim 1, wherein the functional unit comprises a scale configured to detect a weight of the victual to be cooked, the scale being configured to transmit the weight to the control unit.

5. The home appliance system of claim 4, wherein the sensor unit is integrated into a housing of the scale and configured to detect the victual type while the victual is disposed on the scale.

6. The home appliance system of claim 1, wherein the control unit is further configured to suggest a heating zone suitable for cooking the victual, based on the victual type.

7. The home appliance system of claim 6, wherein the control unit is configured to suggest the heating zone via an operator interface of the hob.

8. A hob for a home appliance system, the hob comprising:
a control unit configured to communicate with a functional unit comprising a home appliance device, the functional unit including a sensor unit having a camera configured to generate an image of a victual to be cooked, the sensor unit configured to detect a victual type of the victual to be cooked based on the image of the victual and to communicate the detected victual type to the control unit;
wherein the control unit is configured to determine, based on the detected victual type, an operating parameter and to automatically start an automatic cooking process based on the determined operating parameter, wherein the automatic cooking process includes controlling at least one heating element of the hob based on the determined operating parameter.

9. The hob of claim 8, constructed in the form of an induction hob.

10. The hob of claim 8, wherein the determined operating parameter is a level of heat of the heating element, and wherein the control unit is configured to detect, based on the level of heat, that a cooking pan on the hob will imminently be empty, and to initiate an action to avoid cooking when the cooking pan is empty.

11. The hob of claim 8, wherein the control unit is configured to activate a cooking device other than the hob during the automatic cooking process.

12. The hob of claim 8, wherein the functional unit comprises a refrigerator, and the control unit is further configured to request information from the refrigerator.

13. The hob of claim 8, wherein the sensor unit is integrated into a housing of a scale such that the sensor unit is configured to detect the victual type of the victual to be cooked while the victual is disposed on the scale, and wherein the control unit is further configured to:
receive, from the scale, information about a weight of the victual;
execute, based on the victual type communicated by the sensor unit, an automatic cooking program;
determine, based on the received information about the weight of the victual, that the weight of the victual is lower than an amount requested by the automatic cooking program; and
display, via an operating interface, an operating request for an additional amount of the victual.

14. The hob of claim 8, wherein the control unit is further configured to suggest a heating zone suitable for cooking the victual, based on the victual type.

15. The hob of claim 14, wherein the control unit is configured to suggest the heating zone via an operator interface of the hob.

16. A home appliance system, comprising:
a hob including a controller configured to control at least one heating element of the hob; and
a refrigerator including a sensor unit having a camera configured to generate an image of a victual disposed inside the refrigerator, the sensor unit configured to detect a victual type of the victual disposed inside the refrigerator based on the image of the victual, and a communication unit configured to communicate information about the detected victual type to the controller of the hob;
wherein the controller of the hob is configured to request the information about the detected victual type from the communication unit of the refrigerator, and to determine, based on the detected victual type, an operating parameter and to automatically start an automatic cooking process based on the determined operating parameter, wherein the automatic cooking process includes controlling the at least one heating element of the hob based on the operating parameter.

17. The home appliance system of claim 16, wherein requesting the information about the detected victual type includes requesting a list of available victuals within the refrigerator.

18. The home appliance system of claim 16, wherein the controller of the hob is configured to:
select a recipe from a plurality of stored recipes based on the detected victual type; and
automatically begin executing a cooking program based on the selected recipe.

19. The home appliance system of claim 16, wherein the controller of the hob is configured to:
determine, based on a stored recipe, a first victual type of a victual listed in the stored recipe;
receive, from the communication unit of the refrigerator, an indication whether a victual of the first victual type is available within the refrigerator; and
display, via an operator interface, a user instruction based on the received indication.

20. The home appliance system of claim 19, wherein the home appliance system further comprises a scale configured to detect a weight of a victual disposed on the scale and to transmit the detected weight to the controller of the hob, and wherein the user instruction includes an instruction to retrieve an available victual of the first victual type from the refrigerator and to place the retrieved victual on the scale.

21. The home appliance system of claim 16, wherein the control unit is further configured to suggest a heating zone suitable for cooking the victual, based on the victual type.

22. The home appliance system of claim 21, wherein the control unit is configured to suggest the heating zone via an operator interface of the hob.

* * * * *